US011170430B1

(12) United States Patent
Richards (10) Patent No.: US 11,170,430 B1
(45) Date of Patent: Nov. 9, 2021

(54) SYSTEM, METHOD, APPARATUS, AND COMPUTER PROGRAM PRODUCT FOR PERSONA BASED GIFT SEARCHES FOR ALL OCCASIONS

(71) Applicant: Carl Anthony Richards, Monroe Township, NJ (US)

(72) Inventor: Carl Anthony Richards, Monroe Township, NJ (US)

( * ) Notice: Subject to any disclaimer, the term of this patent is extended or adjusted under 35 U.S.C. 154(b) by 79 days.

(21) Appl. No.: 16/709,461

(22) Filed: Dec. 10, 2019

Related U.S. Application Data

(60) Provisional application No. 62/777,507, filed on Dec. 10, 2018.

(51) Int. Cl.
*G06Q 30/06* (2012.01)
*G06F 3/0482* (2013.01)
*G06F 3/0481* (2013.01)

(52) U.S. Cl.
CPC ....... *G06Q 30/0631* (2013.01); *G06F 3/0482* (2013.01); *G06F 3/04817* (2013.01); *G06Q 30/0623* (2013.01); *G06Q 30/0641* (2013.01)

(58) Field of Classification Search
CPC ..... G06Q 30/0601–0643; G06Q 50/01; G06Q 30/0631; G06Q 30/0623; G06Q 30/0641; G06N 20/00; G06F 3/0482; G06F 3/04817
See application file for complete search history.

(56) References Cited

U.S. PATENT DOCUMENTS

| | | | |
|---|---|---|---|
| 7,468,729 B1 * | 12/2008 | Levinson | A63F 13/87 345/473 |
| 8,392,263 B2 | 3/2013 | Sanguinetti et al. | |
| 2004/0172267 A1 | 9/2004 | Patel et al. | |
| 2006/0010117 A1 | 1/2006 | Bonabeau et al. | |
| 2009/0125410 A1 | 5/2009 | Perlman | |
| 2009/0164334 A1 * | 6/2009 | Schmidt | G06Q 30/0601 705/26.1 |
| 2009/0234755 A1 | 9/2009 | Sidoruk | |
| 2010/0169160 A1 | 7/2010 | Wu et al. | |
| 2012/0330992 A1 | 12/2012 | Kanigsberg et al. | |
| 2013/0073421 A1 * | 3/2013 | Poisson | G06Q 30/02 705/26.7 |
| 2013/0204739 A1 * | 8/2013 | Friedman | G06Q 40/02 705/26.7 |

(Continued)

OTHER PUBLICATIONS

Francesca Gino and Francis Flynn (2011) ,"Give Them What They Want: the Benefits of Explicitness in Gift Exchange", in NA-Advances in Consumer Research vol. 38, eds. Darren W. Dahl, Gita V. Johar, and Stijn M.J. van Osselaer, Duluth, MN : Association for Consumer Research. (Year: 2011).*

*Primary Examiner* — William J Allen
(74) *Attorney, Agent, or Firm* — Dunlap Bennett & Ludwig, PLLC; Brendan E. Squire (57) ABSTRACT

A system, method, an apparatus, and computer program product for persona based gift searches for all occasions. A website and application online search and ordering services, providing a website on a global computer network containing retail items for shopping information in the field of holidays, anniversary, and special occasion gift items and featuring links to the products on related websites of others. Govava software uses psychological image correlation meaning to represent individuals, cultural and sub-cultural attributes and local databases to discern meaning then presents the results.

20 Claims, 4 Drawing Sheets

(56) References Cited

U.S. PATENT DOCUMENTS

| | | | |
|---|---|---|---|
| 2013/0211951 A1 | 8/2013 | Kalinin et al. | |
| 2014/0089327 A1 | 3/2014 | Pavlidis et al. | |
| 2014/0279187 A1 | 9/2014 | Gopinath et al. | |
| 2016/0012491 A1 | 1/2016 | Shah | |
| 2016/0328769 A1* | 11/2016 | Miller | G06Q 30/0643 |
| 2016/0335709 A1 | 11/2016 | Salvatore | |
| 2017/0083963 A1 | 3/2017 | Agarwal | |
| 2017/0177583 A1 | 6/2017 | Cardonha et al. | |
| 2017/0270574 A1* | 9/2017 | Hessurg | G06Q 30/0629 |
| 2019/0340419 A1* | 11/2019 | Milman | G06T 15/02 |

* cited by examiner

SYSTEM, METHOD, APPARATUS, AND COMPUTER PROGRAM PRODUCT FOR PERSONA BASED GIFT SEARCHES FOR ALL OCCASIONS

CROSS-REFERENCE TO RELATED APPLICATION

This application claims the benefit of priority of U.S. provisional application No. 62/777,507, filed Dec. 10, 2018, the contents of which are herein incorporated by reference.

BACKGROUND OF THE INVENTION

The present invention relates to online shopping experiences, and more particularly to shopping assistance to facilitate selection of gifts.

Other search engines are not designed to find a gift exactly or to discern queries to find specific information about gifts. These other sites simply return general search results for the customer based on similarities or looking for patterns in customer behavior.

As can be seen, there is a need for improved systems, apparatus, and business methods to provide to facilitate online shopping experiences in selecting gifts for others.

SUMMARY OF THE INVENTION

In one aspect of the present invention, a method for ordering a gift through an on line gift selection platform is disclosed. The method includes displaying a plurality of personas on a user interface. Each of the plurality of personas are represented by a distinct avatar corresponding to a psychological image correlation meaning of an intended gift recipient. A persona selection corresponding to a perceived persona for an intended gift recipient is received.

One or more product databases are searched for a gift option according to one or more characteristics of the selected persona. The method may then return links to the gift option; and presenting the gift option in a gift selection interface.

In other aspects of the invention, a computerized system for ordering a gift through an online gift selection platform is disclosed. The system includes a computer having a user interface; and a program product having machine-readable program code for causing, when executed, the computer to perform process steps. The process steps include displaying a plurality of personas on a user interface. Each of the plurality of personas are represented by a distinct avatar corresponding to a psychological image correlation meaning of an intended gift recipient.

In some embodiments, a persona selection corresponding to a perceived persona for an intended gift recipient is received by the system.

One or more product databases are then searched for a gift option according to one or more characteristics of the selected persona. Links to the gift option are returned and presented in a gift selection interface.

In yet other aspects of the invention, a computer program product with machine-readable program code that is stored in a non-transient storage medium for causing, when executed, a computer to perform process steps. The process steps include displaying a plurality of personas on a user interface, each of the plurality of personas are represented by a distinct avatar corresponding to a psychological image correlation meaning of an intended gift recipient.

Other steps include, receiving a persona selection corresponding to a perceived persona for an intended gift recipient. Responsive to the persona selection, searching one or more product databases for a gift option chosen according to one or more characteristics of the selected persona.

Yet other steps include, returning links to the gift option and presenting the gift option in a gift selection interface.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provides a system method and apparatus and computer program product, hereinafter Govava, that provides a persona based gift search for all occasions. Govava's persona based search platform uses a psychological image correlation meaning to represent an individual's cultural and sub-cultural attributes and local databases to discern meaning then presents the results.

Govava is configured to find retail or wholesale items as the perfect gift by the input of the users specification of a persona for the individual they are buying for according to one or more demographic and sub-cultures in specific categories. User input of demographic information and attributes in which the system interprets and process to search for items on the internet via API or other. Govava may also use a psychological image correlation meaning to represent individual, cultural and sub-cultural attributes and local databases then presents the results. Govava, may use social media, tracking, and API for demographics, sub-demographics, subcultures, personality demographics, demographic variables, comparative personal analysis and user inputs to correlate information. A plurality of personas, represented via a visual avatar, assimilate personal style comparisons and returns specific and general search results corresponding to a selected Avatar. API used by other companies or vendors as well to correlate and analyze with the other data used.

As stated above, the present invention solves the problem of people guessing what gifts to buy for any and all occasions. Govava solves the problem by helping an individual find the perfect gift(s) item(s) that fit any occasion by using the Govava and algorithm to narrow down the search to a few or many item(s). Using code and API, BIG Data other Govava. The Govava is able to find the perfect gift by the input of the user(s) specification about the individual's demographic, and sub-cultures in specific categories. User input of demographic information and attributes in which the system interprets and process to search for items on the internet or local databases then presents the results.

The present invention, hereinafter, Govava may use one or more algorithms, APIs, BIG Data to take the guesswork out of finding gifts and other services for all occasions for any user. Gevova will also allow users to shop together via the platform simultaneously or other communication methods.

Other search engines are not designed to find exact information or to discern queries to find specific information about gifts, just return general search results for the customer from companies. Some are based on a preferred advertisement.

addition, comparisons of various user's may also be performed based on one or more of:

Keywords used for search; and

Filters used by the customer e.g.

relationship for whom gift is being purchased;

age-bracket;

occasion (birthday; anniversary etc.); and price-range.

This archive of information will help in training the ML model in finding clusters of:

a. similar users and b. similar items.

TABLE 1

| | Transactions | | | | | Heuristic Data | | | | |
|---|---|---|---|---|---|---|---|---|---|---|
| User ID | Liked | Added to Wishlist | Added to Cart | Bought | Dislike | Date of Buying | Relationship | Age-Bracket | Occasion | Price-Range | Search Keywords |
| Priority | 5 | 2 | 3 | 4 | 1 | | | | | | |
| A | | Item 1 | | | | 1/12 | Wife | Adult | Birthday | Low | |
| J | | | Item 11 | Item 11 | | 3/12 | Mother | Old Age | Birthday | Medium | Mother's Day |
| J | | | | Item 7 | | 3/12 | Brother | Teenage | Birthday | High | |
| A | Item 9 | | | | | 3/12 | Father | Old Age | Retirement | Low | Retirement gift |
| C | | | Item 4 | Item 4 | Item 4 | 3/12 | Wife | Adult | Promotion | Low | |
| H | | Item 98 | | | | 5/12 | Mother | Old Age | Birthday | Medium | |
| S | | | Item 35 | Item 35 | | 5/12 | Husband | Adult | Anniversary | High | |
| D | | Item 9 | Item 9 | | | 5/12 | Husband | Adult | Birthday | Low | |
| D | | Item 7 | | | | 5/12 | Sister | Teenage | Wedding | Medium | Sister love |

Govava uses social media, tracking routines and API for demographics, sub-demographics, subcultures, personality demographics, demographic variables, comparative personal analysis and user inputs to correlate information, visual avatars, personal styles comparisons and return specific and general results. API used by other companies or vendors as well to correlate and analyze with the other data used.

Figure 1:
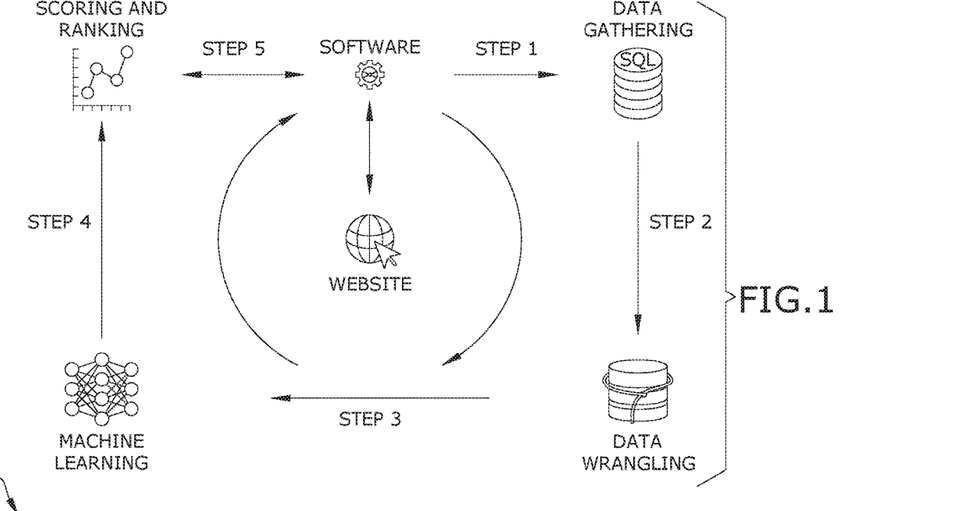
FIG. 1 is a schematic diagram of a system architecture for a persona based gift search system.

As seen in reference to FIG. 1, a system architecture for Govava is illustrated. The system may include a website hosted on one or more servers. Data gathering is accomplished via an SQL database for user input. Data gathering may also be accomplished where Govava maintains a record of various user transactions. 'Transactions' here imply any of the following:

a. Buying an item b. Adding item to cart c. Adding to wishlist d. Liking the item e. Disliking the item Since machine learning models rely heavily on data, taking feedback from the customer is going to be extremely important. Accordingly, from time to time, Govava may enable giving reward points for those customers/buyers that provide feedback. This feedback helps the ML model generate more insights.

Apart from registering every single transaction of every user, Govava may also record the following data elements:

Time spent viewing each item.

Date of the transaction.

In addition, given that the site is utilized for buying gifts items, Govava can learn the important event dates/months for each user and start recommending them accordingly. In Data wrangling performs structuring and formatting the Input. In this case, raw transaction data is structured and formatted, after being fetched from the SQL database linked to Govava is re-arranged in a format suitable for a machine learning (ML) module. Table 2 illustrates a data wrangling.

TABLE 2

| | USER IDs | | | | | | |
|---|---|---|---|---|---|---|---|
| Item IDs | A | B | C | D | E | F | G |
| 1 | 2 | | | | | | |
| 2 | | | | | | | |
| 3 | | | | | | | |
| 4 | | | 1 | | | | |
| 5 | | | | | | | |
| 6 | | | | | | | |
| 7 | | | | 2 | | | |
| 8 | | | | | | | |
| 9 | 5 | | | 3 | | | |
| 10 | | | | | | | |

The heuristic data will be used for hard-coding of logic. e.g. recommending similar category items to someone who had bought a birthday gift for her mother the same month last year. So, the recommendation engine for Govava website will be a healthy blend of both, (predominantly) machine learning based as well as (occasional) rule-based logic too.

The results obtained from the data wrangling are further processed via the ML module. The ML module is configured to analyze heuristic data that will be used for hard-coding of logic. By way of non-limiting example, recommending a similar category gift item to someone who (for example) had bought a birthday gift for her mother the same month last year. In this case, the recommendation engine for Govava website presents a healthy blend of both, (predominantly) ML based as well as (occasional) rule-based logic.

Each item and each user is being represented by its unique "embeddings". i.e. an array of numbers. Under the hood, embeddings are based on latent (hidden) features which are useful in understanding users (e.g. age, gender, income level etc.) and items (category, price range, color, size etc.). Typically, the dimension of such embeddings, varies from 10-50. Several different values within this range may be employed, in order to arrive at the most optimal one for Govava users.

A scoring and ranking module is provided for learning a plurality of embeddings. Through Matrix Factorization. i.e. decomposing the original user-behavior (transactions) into smaller and more flexible elements. Just like a number can be represented in different ways: 64=1*64; 64=2*32; 64=4*16; 64=8*8; 64=16*4; 64=32*2; or 64=64*1. Similarly, there can be multiple possible combinations of the embedding representations. i.e. numbers inside the arrays.

The ML model compares its initial predictions of user-preferences, with actual transactions from the Govava website and optimizes the 'weights' (values inside the matrix) accordingly. In other words, the model is trying to learn those sets of values for the plurality of embeddings which are representative of the actual user-preferences. This is where the machine learning learns how to do the needful.

Once the plurality of embeddings have been learned, various items need to be scored and ranked (sorted). This ranking of items will be unique for each different user. This output of the ML model will be passed on to Govava in the form of a JSON file and displays the corresponding items for each user on Govava website Home Page. When the user logs in, the Govava home page may display, for example, the top 10 gift items that User A is most likely to be interested in. Going forward, the quality of the ML model predictions are judged, based on how similar the predicted gifts compare with the actual user behavior is selecting a gift item through the Govava website.

Figure 2:
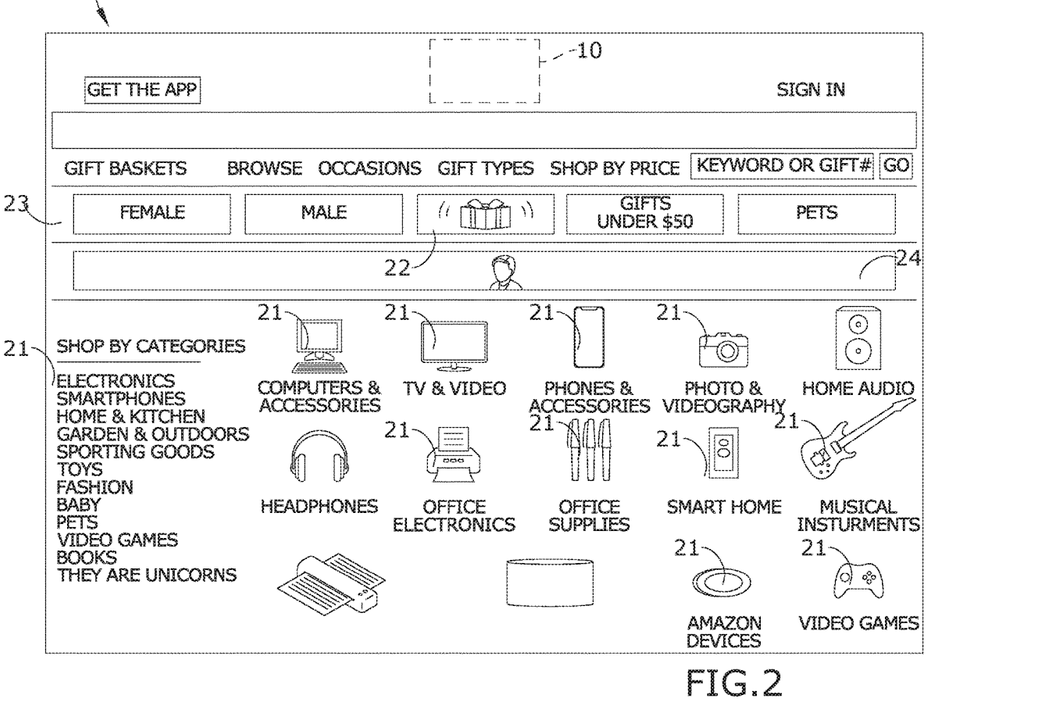
FIG. 2 is a schematic view of a homepage for a browser implementing the persona based gift selection system.

FIG. 2 is a representative use interface for a browser based shopping platform according to aspects of the invention. The browser interface includes a home page 20 and may list a plurality of products 21 arranged either graphically or textually according to a plurality of item categories. The home page 20 may include a banner area 10 for branding of the shopping platform. The browser interface may also display one or more trending items 22, linked to a description and purchase option for the trending item 22. Selection of the one or more trending items 22 for display may be based upon Govava analytics. A plurality of filter controls 23 may be provided to segregate and search for items, such as by gender, a price point, or other filter.

Figure 3:
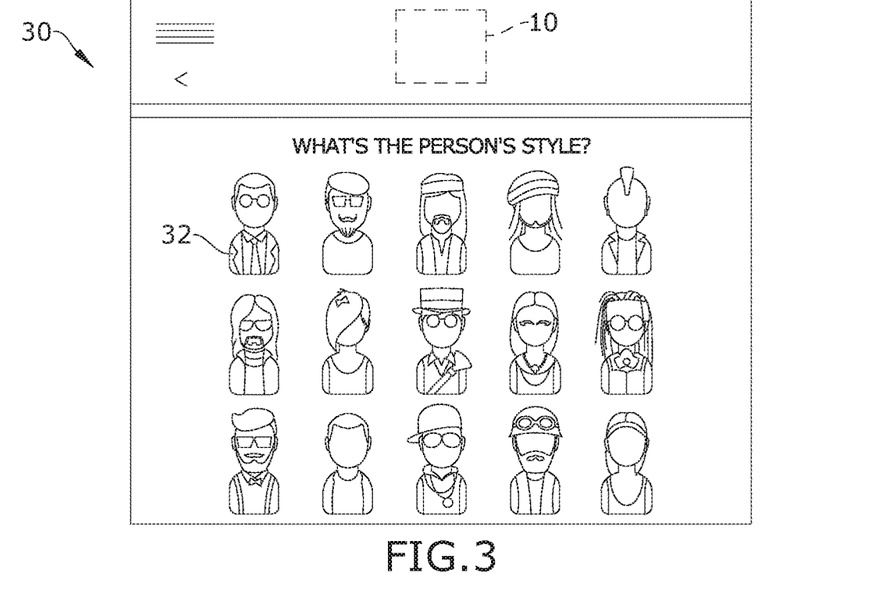
FIG. 3 is a diagram of a persona selection interface for a persona based gift selection system.

A persona control 24 allows the user to define one or more parameters and demographic information for an intended recipient of a gift item. Upon activation of the persona control 24, the user is presented a persona selection interface 30, such as shown in reference to FIG. 3. The persona selection interface 30 includes a plurality of personas 32, each represented by a distinct avatar, corresponding to a psychological image correlation meaning of the gift recipient. A plurality of pages of selectable personas 32 may be provided to allow the user to select a persona that they feel most closely identifies the intended gift recipient.

Figure 4:
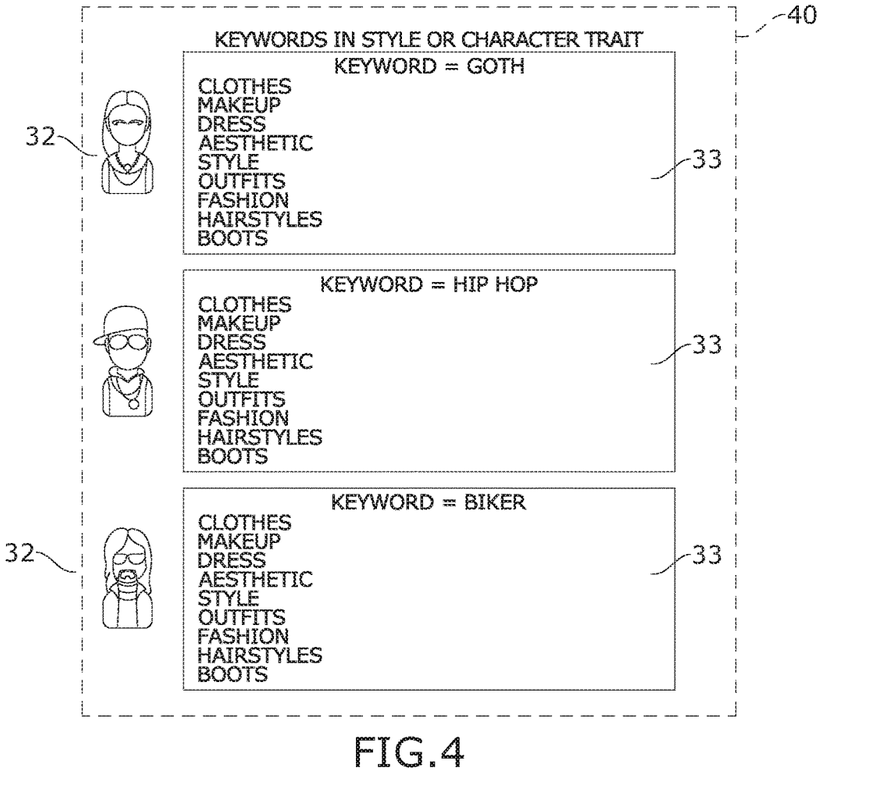
FIG. 4 is a diagram of a persona definition interface.

As seen in reference to FIG. 4, each of the plurality of personas 32, may be defined in a persona definition interface 40. The plurality of personas 32 may be defined according to a unique keyword associated with a style or a character trait representing the persona 32. The persona 32 may be further correlated according to one or more persona characteristics 33 such as clothing, makeup, dress, aesthetic, style, outfits, fashion, hairstyles, footwear, age, gender, or other demographic, cultural, or sub-cultural traits. In some embodiments, the persona definition interface 40 is provided to a web host service to define the plurality of personas 32. In other embodiments, the persona definition interface 40 is provided to permit a user to further define the persona, personal traits and characteristics of the intended recipients. In either case, the persona definition characteristics 33 are utilized with a machine learning module to match a gift to an intended recipient of the gift based on the plurality of designated personas 32.

Figure 5:
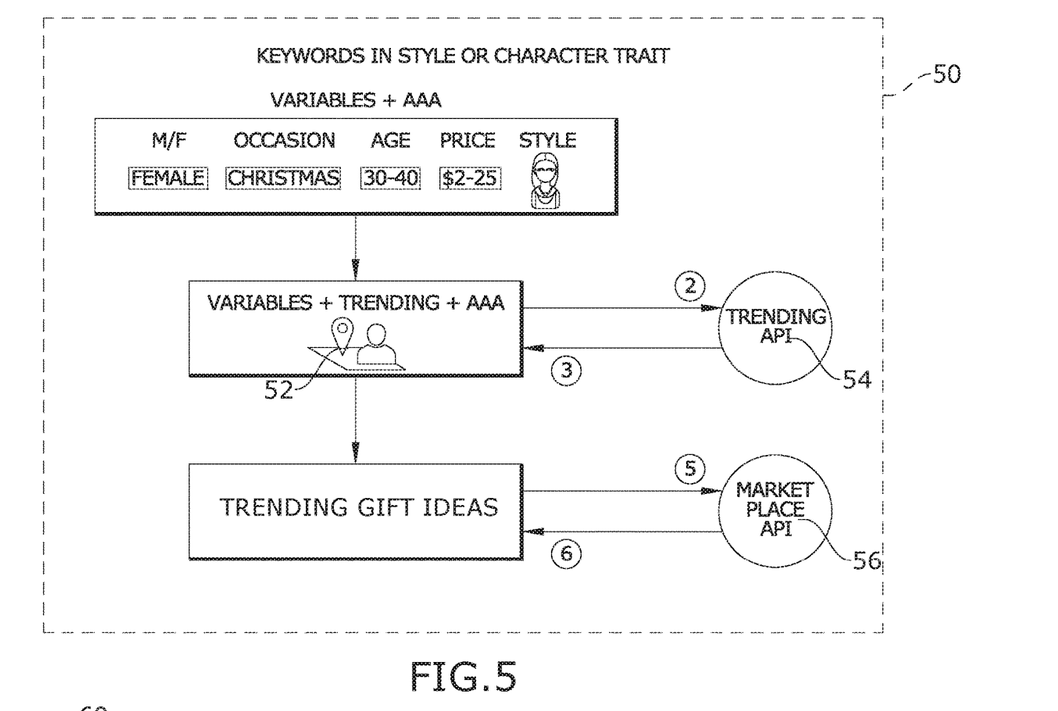
FIG. 5 is a diagram of an administration user interface.

As seen in reference to FIG. 5, an administration panel 50 is provided to provide input for demographic information and assessing trending products according to a plurality of demographic variables, trending products, and a variable AAA, where AAA is a variable input from keywords added in conjunction with each character: occasion, style, price, Age, Male and Female. The results is used with the ML module. Each input is scored and tracked via the machine code. Govava then processes, indexes and saves the pattern. The ML module then send the results based on the variable that the user initially input.

The demographic variables may also include a geo location 52 for the intended recipient. The Govava administration panel 50 uses the psychological image correlation meaning to represent individuals, cultural and sub-cultural attributes and local databases to discern meaning then presents the results.

Figure 6:
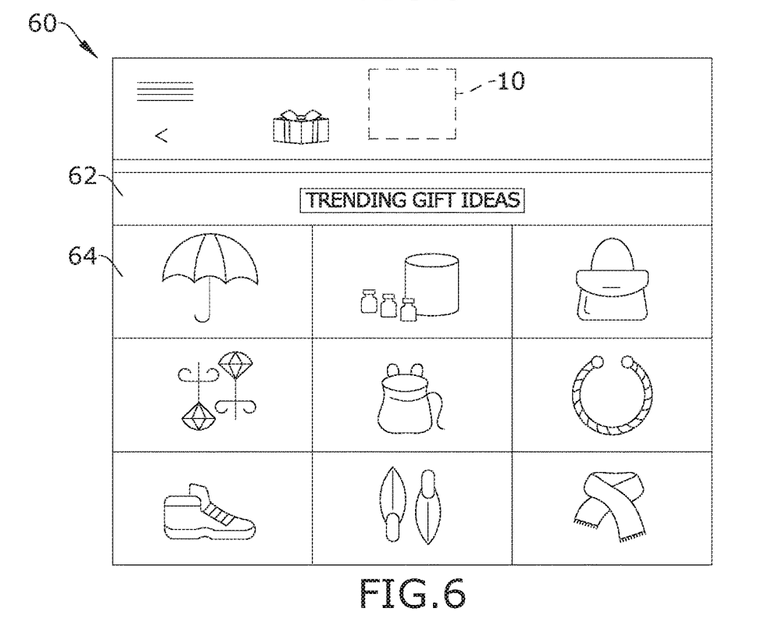
FIG. 6 is a diagram of a gift selection user interface.

The marketplace API 53 is configured to execute transactions once the user makes a gift selection via a gift selection interface 60. FIG. 6 illustrates a representative gift selection interface 60. The gift selection interface 60 presents the output results of the trending API 54 to present one or more trending gift ideas 62.

As previously indicated, the trending gift ideas 62 may be based on a machine learning assessment of consumer transactions for a variety of products according to the selected persona 32 of the intended recipient of the gift. The trending gift ideas 62 may present the trending gift ideas 62 with one or more gift options 64. The one or more gift options 64 may be selected to present additional information pertaining to a gift option 64. The selected gift option 64 may be sold through Govava or through a third party vendor of the selected gift option 64.

The Govava analytics engine will be used to discern user text to extract meaning to help the Govava system provide search results. As will be appreciated, the ML module has the potential to keep getting better with time. As more transactions are executed on Govava better ML-based recommendations (predictions) are provided, which in turn, further lead to more usage and mode traffic on the Govava website. So, over time, this virtuous cycle acquires a momentum of its own. For that to happen, the ML model is updated at regular temporal intervals. i.e. Steps 1-5 are repeated over and over again.

Govava may also have the ability for a user to send a request to one or more friends, family or loves ones to assist with making a gift selection for the gift recipient. This will give users the flexibility to shop simultaneously for gift items in delayed or real-time environment.

Govava may connect to one or more APIs 54, 56 and correlate with the persona input from a user shopping for a gift recipient. Govava may also be used as an advertising tool or mechanism to target specific customers. Likewise, the Govava system may be used to learn consumer patterns, analyze, discern and produce statistics. Govava can produce analytics in targeted advertising or introducing products to consumers.

Figure 7:
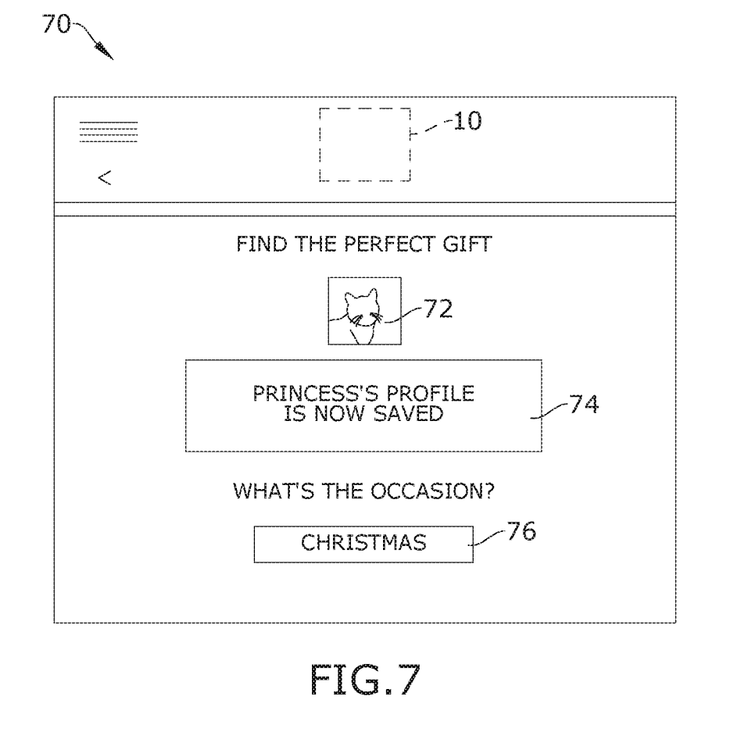
FIG. 7 is a diagram of a pet gift definition user interface.

As seen in reference to FIG. 7, Govava may also be utilized to locate a gift item for a pet through a pet user interface 70, according to a profile 72 for the pet according to a specification 74 of the pet's attributes, breed, color, and behavioral characteristics. The pet user interface 70 may also be utilized to select a designated holiday or event 76.

The system of the present invention may include at least one computer with a user interface. The computer may include any computer including, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The computer-based data processing system and method described above is for purposes of example only, and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A method for ordering a gift through an online gift selection platform, comprising:
    storing, in a data repository, a plurality of user transactions with an item on the online gift selection platform as a raw transaction data;
    wrangling the raw transaction data into a structure and a format as a learning input to a machine learning (ML) model to represent each item and each user by a unique embedding, represented as an array, associated with each item and each user;
    learning in the ML model from the unique embedding a set of values representative of a user and a user item preference;
    displaying a plurality of personas on a user interface, each of the plurality of personas represented by a distinct avatar corresponding to a psychological image correlation meaning of an intended gift recipient;
    receiving a persona selection corresponding to an intended gift recipient;
    applying a plurality of persona definition characteristics for the persona selection as an input to the ML model; and
    displaying a plurality of gift recommendations on the user interface, wherein each of the plurality of gift recommendations is based on a matching of the ML model.

2. The method of claim 1, further comprising:
    returning a link to each of the plurality of gift recommendations; and
    presenting the link to each of the plurality of gift recommendations in a gift selection interface.

3. The method of claim 1, further comprising:
    decomposing the plurality of user transactions with a scoring and a ranking through a matrix factorization.

4. The method of claim 1, wherein the plurality of user transactions is selected from the group consisting of: a purchase of the item; an adding of the item to a cart; an adding of the item to a wish list; a linking to the item; and a disliking of the item.

5. The method of claim 1, further comprising:
    comparing the plurality of gift recommendations with an actual transaction of the user; and
    weighting the array responsive to the actual transaction.

6. The method of claim 1, further comprising:
    providing a persona control operable to invoke a persona definition interface; and
    presenting in the persona definition interface the plurality of persona definition characteristics for the persona selection.

7. The method of claim 6, further comprising:
    receiving, via the persona definition interface, a refinement of the persona definition characteristics for the intended gift recipient.

8. A computerized system for ordering a gift through an online gift selection platform, the computerized system comprising:
    a computer having a user interface; and
    a program product comprising machine-readable program code for causing, when executed, the computer to perform the following process steps:
    storing, in a data repository, a plurality of user transactions with an item on the online gift selection platform as a raw transaction data;
    wrangling the raw transaction data into a structure and a format as a learning input to a machine learning (ML) model to represent each item and each user by a unique embedding, represented as an array, associated with each item and each user;
    learning in the ML model from the unique embedding a set of values representative of a user and a user item preference;
    displaying a plurality of personas on a user interface, each of the plurality of personas represented by a distinct avatar corresponding to a psychological image correlation meaning of an intended gift recipient;

receiving a persona selection corresponding to an intended gift recipient;

applying a plurality of persona definition characteristics for the persona selection as an input to the ML model; and displaying a plurality of gift recommendations on the user interface, wherein each of the plurality of gift recommendations is based on a matching of the ML model.

9. The computerized system of claim 8, further comprising:

returning a link to each of the plurality of gift recommendations; and presenting the link to each of the plurality of gift recommendations in a gift selection interface.

10. The computerized system of claim 8, further comprising:

decomposing the plurality of user transactions with a scoring and a ranking through a matrix factorization.

11. The computerized system of claim 8, wherein the plurality of user transactions is selected from the group consisting of: a purchase of the item; an adding of the item to a cart; an adding of the item to a wish list; a linking to the item; and a disliking of the item.

12. The computerized system of claim 8, further comprising:

comparing the plurality of gift recommendations with an actual transaction of the user; and weighting the array responsive to the actual transaction.

13. The computerized system of claim 8, further comprising:

providing a persona control operable to invoke a persona definition interface; and presenting in the persona definition interface the plurality of persona definition characteristics for the persona selection.

14. The computerized system of claim 13, further comprising:

receiving, via the persona definition interface, a refinement of the persona definition characteristics for the intended gift recipient.

15. A computer program product comprising machine-readable program code stored in a non-transient storage medium for causing, when executed, a computer to perform the following process steps:

storing, in a data repository, a plurality of user transactions with an item on an online gift selection platform as a raw transaction data;

wrangling the raw transaction data into a structure and a format as a learning input to a machine learning (ML) model to represent each item and each user by a unique embedding, represented as an array, associated with each item and each user;

learning in the ML model from the unique embedding a set of values representative of a user and a user item preference;

displaying a plurality of personas on a user interface, each of the plurality of personas represented by a distinct avatar corresponding to a psychological image correlation meaning of an intended gift recipient;

receiving a persona selection corresponding to an intended gift recipient;

applying a plurality of persona definition characteristics for the persona selection as an input to the ML model; and displaying a plurality of gift recommendations on the user interface, wherein each of the plurality of gift recommendations is based on a matching of the ML model.

16. The computer program product of claim 15, further comprising:

returning a link to each of the plurality of gift recommendations; and presenting the link to each of the plurality of gift recommendations in a gift selection interface.

17. The computer program product of claim 15, further comprising:

decomposing the plurality of user transactions with a scoring and a ranking through a matrix factorization.

18. The computer program product of claim 15, wherein the plurality of user transactions is selected from the group consisting of: a purchase of the item; an adding of the item to a cart; an adding of the item to a wish list; a linking to the item; and a disliking of the item.

19. The computer program product of claim 15, further comprising:

comparing the plurality of gift recommendations with an actual transaction of the user; and weighting the array responsive to the actual transaction.

20. The computer program product of claim 15, further comprising:

providing a persona control operable to invoke a persona definition interface;

presenting in the persona definition interface the plurality of persona definition characteristics for the persona selection.

* * * * *